US 6,646,101 B2

(12) United States Patent
Kratschmer et al.

(10) Patent No.: US 6,646,101 B2
(45) Date of Patent: Nov. 11, 2003

(54) USE OF COPOLYCARBONATES

(75) Inventors: Silke Kratschmer, Krefeld (DE); Klaus Horn, Dormagen (DE); Annett König, Krefeld (DE); Rolf Wehrmann, Krefeld (DE); Steffen Kühling, Meerbusch (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/291,097

(22) Filed: Nov. 8, 2002

(65) Prior Publication Data

US 2003/0092873 A1 May 15, 2003

Related U.S. Application Data

(62) Division of application No. 09/962,168, filed on Sep. 24, 2001.

(30) Foreign Application Priority Data

Sep. 26, 2000 (DE) .......................................... 100 47 483

(51) Int. Cl.$^7$ ................................................ C08G 64/00
(52) U.S. Cl. ...................... 528/196; 528/198; 359/109; 359/361; 296/37.1; 428/412
(58) Field of Search ............................... 528/196, 198; 359/109, 361; 428/412; 296/37.1

(56) References Cited

U.S. PATENT DOCUMENTS

| 5,401,826 A | 3/1995 | Sakashita et al. ............ 528/204 |
| 5,470,938 A | 11/1995 | Sakashita et al. ............ 528/198 |
| 5,532,324 A | 7/1996 | Sakashita et al. ............ 525/462 |

FOREIGN PATENT DOCUMENTS

EP          0 544 407          6/1993

Primary Examiner—Terressa M. Boykin
(74) Attorney, Agent, or Firm—Joseph C. Gil; Aron Preis

(57) ABSTRACT

The present invention provides the use of impact resistant, stress cracking resistant copolycarbonates with particularly good low temperature properties for applications in which particularly good low temperature properties are required, e.g., for automobile construction or external applications, and new copolycarbonates themselves.

5 Claims, No Drawings

USE OF COPOLYCARBONATES

This application is a divisional of U.S. Ser. No. 09/962,168, filed Sep. 24, 2001.

The present invention provides the use of impact resistant, stress cracking resistant copolycarbonates with particularly good low temperature properties for applications in which particularly good low temperature properties and good impact behavior after heat aging are required, e.g., for automobile construction or external applications, and new copolycarbonates themselves.

For automobile construction and other external applications there has long been a search for polycarbonates which are as resistant as possible to chemicals and preferably transparent and which, on the one hand, are resistant to low temperatures and on the other hand have good aging stability. The object was, therefore, to find a transparent polycarbonate which, on the one hand, exhibits improved low temperature impact strength compared with polycarbonate composed of pure 2,2-bis(4-hydroxyphenyl)propane and, on the other hand, has increased aging stability, with improved stress cracking behaviour.

Polycarbonates typically loose their notched impact strength and become brittle at low temperatures. Additionally polycarbonates display, after storage at temperatures below the glass transition temperature, an ageing effect which is dependent on the period of storage and the temperature and as a result of which the high energy level of the notched impact strength is considerably decreased (Bottenbruch et al., Engineering Thermoplastics Polycarbonates, Polyacetals, Polyesters, Cellulose Esters, Carl Hanser Verlag, Munich, Vienna, N.Y., 1996, p. 183 et seq.).

Copolycarbonates based on 4,4'-dihydroxydiphenyl and 2,2-bis(4-hydroxyphenyl)propane are already known from JP 5117382 and have been described in EP-A1 0 544 407, U.S. Pat. No. 5,470,938, U.S. Pat. No. 5,532,324 and U.S. Pat. No. 5,401,826 as being particularly chemical resistant, heat resistant and flame resistant whilst having, compared with commercial polycarbonate of pure bisphenol, the same mechanical properties and transparency. There is no indication whatsoever in the prior art, however, that these copolycarbonates have particularly good low temperature properties or a particularly good impact behavior after heat aging.

The problem therefore consisted in obtaining an polycarbonate with high transparency which on the one hand possesses improved low temperature properties, i.e. good notched impact strength even at low temperatures, especially compared to usual polycarbonate made of 2,2-bis(4-hydroxyphenyl)propane, and on the other hand shows an improved ageing behaviour when tempered below glass temperature besides enhanced environmental stress cracking.

It has now surprisingly been found that the copolycarbonate according to the invention does not exhibit any ageing effects upon storage at temperatures below the glass transition temperature, so that the high energy level of the notched impact strength is maintained.

These unexpected ageing properties of the copolycarbonate according to the invention are of major importance for practical use. Many uses are subject to continuously changing thermal conditions. The copolycarbonate according to the invention thus represents a material which has very high notched impact strength at low temperatures and which does not however lose this property as a result of storage at high temperatures due to ageing effects.

The present invention relates, therefore, to the use of copolycarbonates which are composed of 0.1 mole % to 46 mole %, preferably 11 mole % to 34 mole % and particularly 26 mole % to 34 mole % of compounds corresponding to formula (I)

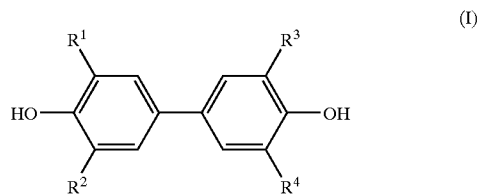

wherein
$R^1$ to $R^4$ independently of one another, stand for H, $C_1$–$C_4$-alkyl, phenyl, substituted phenyl or halogen, preferably for H, $C_1$–$C_4$-alkyl or halogen and particularly preferably all stand for the same radical, particularly for H or tert.-butyl, and complementary amounts, that is, 99.9 mole % to 54 mole %, preferably 89 mole % to 66 mole % and particularly 74 mole % to 66 mole % of compounds corresponding to formula (II)

$$\text{(II)}$$

wherein
$R^5$ to $R^8$ independently of one another, are H, $CH_3$, Cl or Br, and
X is $C_1$–$C_5$-alkylene, $C_2$–$C_5$-alkylidene, $C_5$–$C_6$-cycloalkylene, $C_5$–$C_{10}$-cycloalkylidene, as monomers, as materials in areas in which particularly good low temperature properties and good aging stability are required.

More particularly preferred copolycarbonates and themselves the subject of the invention are those composed of 34–26 mole %, especially 33–27 mole %, particularly 32–28 mole %, more especially 31–29 mole %, and particularly preferably 30 mole % of monomer corresponding to formula (I), in each case supplemented by a complementary proportion of monomer corresponding to formula (II).

The percentage of monomers is defined based on 100 mole % representing the whole content of Bisphenols in the polycarbonate. A pure Bisphenol A Polycarbonate would therefore be defined as 100 mole % of Bisphenol A. The carbonate Part of derived from carbonic acid esters or halides is not taken into account.

Copolycarbonates which are preferred, particularly preferred or most preferred are those containing the compositions defined under preferred, particularly preferred or most preferred.

The general definitions, quantitative ratios or connotations stated above or those stated in preferred ranges, can however also be combined with each other in any desired manner, i.e. from among the respective ranges and preferred ranges. They apply correspondingly to the end products and to the precursors and intermediates.

Surprisingly, it has now become apparent that these copolycarbonates have particularly good low temperature properties and good impact behaviour after heat ageing. They may therefore be used as moulded articles in all applications where the polycarbonates known hitherto are inadequate in terms of their range of properties, particularly, e.g., in the electrical sector and in the construction sector, for coverings or glazing, particularly in the automotive sector as films, sheets, fittings parts or housing parts, and in the optical sector as lenses and data stores, and as consumer goods, namely in cases where increased heat resistance or chemical resistance is required at the same time as good low temperature properties. In addition, they may also replace other materials in which conventional polycarbonates could not be used hitherto because of their inadequate low temperature properties for said purpose.

According to the invention, the term good low temperature properties means, by way of example but not in a restrictive manner, good low temperature notched impact strength, since conventional polycarbonates become brittle at low temperatures and thus have a tendency to fracture and crack.

According to the invention, the term low temperatures means temperatures below 0° C., preferably below –10° C., particularly preferably below –20° C., more particularly preferably below –30° C., particularly below –40° C. and preferably below –50° C.

According to the invention high thermal stability is understood to be, by way of example and not limitation, high notched impact strength after tempering, since commonly available polycarbonates become brittle after tempering and thus tend to fracture and tear.

According to the invention tempering is understood to be storage at temperatures below the glass transition temperature of about 155° C., preferably between 40 and 140° C., particularly preferably 60–140° C., most particularly preferably 80–140° C.

Preferred compounds corresponding to formula (I) are 4,4'-dihydroxydiphenyl (DOD) and 4,4'-dihydroxy-3,3',5,5'-tetra(tert.-butyl)diphenyl, 4,4'-Dihydroxy-3,3',5,5'tetra(n-butyl)diphenyl and 4,4'-dihydroxy-3,3',5,5'tetra(methyl)diphenyl, particularly 4,4'-dihydroxydiphenyl.

Preferred compounds corresponding to formula (II) are 2,2-bis(4-hydroxyphenyl)propane, 1,1-bis(4-hydroxyphenyl)-3,3,5-trimethylcyclohexane and 1,3-bis[2-(4-hydroxyphenyl)-2-propyl]benzene, 1,1-bis(4-hydroxyphenyl)-1-phenylethane, 1,1-bis(4-hydroxyphenyl)-cyclohexane, preferably 2,2-bis(4-hydroxyphenyl)propane (bisphenol A) and 1,1-bis(4-hydroxyphenyl)-3,3,5-trimethylcyclohexan (bisphenol TMC), particularly preferably 2,2-Bis(4-hydroxyphenyl)propan (bisphenol A).

It is possible to use both one compound corresponding to formula (I), with the formation of binary copolycarbonates, and several compounds corresponding to formula (I).

It is also possible to use both one compound corresponding to formula (II), with the formation of binary copolycarbonates, and several compounds corresponding to formula (II).

The starting products corresponding to formula (I) and (II) may of course contain impurities due to the synthesis. High purity is desirable, however, and should be sought, so these starting products are using in the highest possible purity.

Processes for production of Polycarbonates an Copolycarbonates are well-known in the literature and are applied to the Polycarbonates and Copolycarbonates according to the invention.

According to DE-OS 2 119 779, the preparation of polycarbonates takes place with the participation of monomers corresponding to formula (I) preferably in solution, namely by the interfacial process and the homogeneous phase process.

For the preparation of polycarbonates by the interfacial process, reference is made by way of example to "Schnell", Chemistry and Physics of Polycarbonates, Polymer Reviews, Vol. 9, Interscience Publishers, New York, London, Sydney 1964 and to Polymer Reviews, Volume 10, "Condensation Polymers by Interfacial and Solution Methods", Paul W. Morgan, Interscience Publishers, New York 1965, Chapter VIII, p. 325 and EP 971 790.

In addition, the preparation may also be carried out by the well known polycarbonate preparation process in the melt (known as the melt transesterification process) which is described, e.g., in DE-OS 19 64 6401 or in DE-OS 1 42 38 123. In addition, transesterification processes (acetate process and phenyl ester process) are described, for example, in U.S. Pat. Nos. 3,494,885, 4,386,186, 4,661,580, 4,680,371 and 4,680,372, in EP-A 26 120, 26 121, 26 684, 28 030, 39 845, 91 602, 97 970, 79 075, 146, 887, 156 103, 234 913 and 240 301 and in DE-A 1 495 626 and 2 232 997.

The polycarbonates according to the invention possess molecular weights (Mw, weight average) of 10.000 to 60.000, preferably of 20.000 to 55.000, determined by measuring the relative solution viscosity in Dichloromethane or in 50:50 mixtures of Phenol/o-Dichlorobenzene, calibrated by the light scattering method.

The polycarbonates according to the invention are melt processable in the usual way at temperatures from 240° C. to 380° C., preferably from 260° C. to 360° C. Any moulded and extruded articles and films may be prepared in the known way by injection moulding or by extrusion.

Such moulded and extruded articles are also subject matter of the present invention.

The polycarbonates according to the invention are freely soluble in solvents such as chlorinated hydrocarbons, e.g., methylene chloride, and may thus be processed, for example, in the known way to cast films.

The combination of properties such as heat resistance, good low temperature properties in combination with good impact behavior after heat aging and resistance to chemicals permits a wide use of the copolymers according to the invention. Potential applications for the polycarbonates according to the invention include:

1. Safety screens/windows, which are known to be required in many parts of buildings, vehicles and airplanes, as well as shields for helmets.
2. Production of films, and in particular films and thin sheet layers for skis.
3. Production of blow molded hollow body parts (see for example U.S. Pat. No. 2,964,794), such as for example 1- to 5-gallon water bottles.
4. Production of transparent sheets, and in particular multi-wall sheets, such as for example for covering buildings such as railway stations, greenhouses and lighting installations.
5. Production of optical data storage media.
6. For the production of traffic light housings or road signs.
7. For the production of foams (see for example DE-AS 1 031 507).
8. For the production of filaments and wires (see for example DE-AS 1 137 167 and DE-OS 1 785 137).
9. As translucent plastics containing glass fibres for lighting purposes (see for example DE-OS 1 554 020).
10. As translucent plastics containing barium sulphate, titanium dioxide and/or zirconium oxide or organic polymeric acrylate rubbers (EP 634 445, EP 269 324) for the production of transparent and light-scattering parts.
11. For the production of precision injection-molded parts, such as for lens holders. For this purpuose polycarbonates are used with a content of glass fibers which optionally additionally contain about 1–10 wt. % of $MoS_2$, based on the total weight.

12. For the production of optical parts of devices, and in particularly lenses for cameras (see for example DE-OS 2 701 173).
13. As light transmission carriers, and in particularly as light pipes (see, for example EP-A1 0 089 801).
14. As electrically insulating materials for electrical conductors and for plug casings and plug-and-socket connectors.
15. Production of mobile telephone housings with improved resistance to perfumes, after-shaves and perspiration.
16. Network interface devices.
17. As a carrier material for organic photoconductors.
18. For the production of lighting lenses, such as for example automotive headlight lamps, diffusing screens or interior bulb cap lenses, spot light lenses and general lighting lenses.
19. For medical applications, such as for example oxygenators, dialyzers.
20. For food applications, such as for example bottles, tableware and chocolate moulds.
21. For applications in the automobile sector, where contact with fuels and lubricants can occur, such as for example for bumpers, optionally in the form of suitable blends with ABS or suitable rubbers.
22. For sports articles, such as for example slalom poles snow boards and ski shoe bindings.
23. For household articles, such as for example for kitchen sinks and postbox housings.
24. For housings such as for example electrical enclosures.
25. Casings for electric toothbrushes and hair-drier housings.
26. Transparent washing machine doors with improved resistance to the washing liquid.
27. Safety goggles, optical correction glasses.
28. Lamp covers for kitchen installations having improved resistance to kitchen vapors, an in particular oil vapors.
29. Packaging films for medications.
30. Chip boxes and chip carrier trays.
31. For other applications, such as for example for stable doors or animal cages.

In particular, films may be produced from the high molecular weight aromatic polycarbonates of the invention. The films have preferred thicknesses from 1 μm to 1500 μm, particularly preferred thicknesses from 10 μm to 900 μm.

The films obtained may be monoaxially or biaxially oriented in an inherently known way, preferably in a ratio of 1:1.5 to 1:5.

The films may be produced by the known methods for film production, e.g., by extrusion of a polymer melt through a flat film die, by blowing on a film blowing machine, by thermoforming or casting. It is possible for the films to be used on their own. They may also, of course, be used to produce composite films with other plastics films by the conventional methods; in principle, depending on the desired application and final property of the composite film, all the known films are suitable as partners. A composite of two or more films may be produced.

In addition, the copolycarbonates according to the invention may also be used in other layer systems, such as, e.g., in coextruded sheets.

The polycarbonates according to the invention may contain various terminal groups. These are introduced by chain terminators. Chain terminators within the meaning of the invention are those corresponding to formula (III)

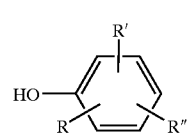

(III)

wherein

R, R' and R", independently of one another, may represent H, optionally branched $C_1$–$C_{34}$-alkyl/cycloalkyl, $C_7$–$C_{34}$-alkaryl or $C_6$–$C_{34}$-aryl, for example, butyl phenol, trityl phenol, cumyl phenol, phenol, octyl phenol, preferably butyl phenol or phenol.

The polycarbonates may contain small amounts from 0.02 mole % to 3.6 mole % (based on the dihydroxy compound) of branching agents. Suitable branching agents include the compounds having three and more functional groups suitable for polycarbonate production, preferably those having three or more than three phenolic OH groups, for example, 1,1,1-tri-(4-hydroxyphenyl)ethane and isatin biscresol.

In order to alter the properties, auxiliaries and reinforcing agents may be added to the polycarbonates according to the invention. Suitable agents of this kind include, inter alia: heat and UV stabilisers, flow promoters, mould release agents, flame retardants, pigments, finely divided minerals, fibrous materials e.g., alkyl and aryl phosphites, phosphates, phosphanes, low molecular weight carboxylates, halogen compounds, salts, chalk, quartz flour, glass fibres and carbon fibres, pigments and combinations thereof. Such compounds are described, e.g., in WO 99/55772, p. 15–25, and in "Plastics Additives", R. Gächter and H. Müller, Hanser Publishers 1983.

Moreover, other polymers may also be added to the polycarbonates according to the invention, e.g., polyolefins, polyurethanes, polyesters, acrylonitrile butadiene styrene and polystyrene.

These substances are added preferably to the finished polycarbonate in conventional machines, but they may also be added at another stage of the production process, depending on requirements.

The examples below are intended to illustrate the present invention but without limiting its scope.

EXAMPLES

Various polycarbonates were synthesised by the known methods of preparation in the melt, as described, for example, in DE 4 238 123 and by the interfacial method, as described, for example, in "Schnell", Chemistry and Physics of Polycarbonates, Polymer Reviews, Vol. 9, Interscience Publishers, New York, London, Sydney 1964, and compared with commercial Makrolon with comparable viscosity.

The relative solution viscosity was determined in dichloromethane in a concentration of 5 g/l at 25° C., calibrated by the light scattering method tert.-Butylphenol was in all cases used as a chain terminator within the interfacial process, no extra chain terminator was applied using the melt transesterification process.

The flexural impact test to ISO 180/4A was used to determine the impact resistance.

Example 1

A polycarbonate with 30 mole % of dihydroxydiphenyl (DOD) and 70 mole % of bisphenol A was prepared by the interfacial process. The granules had a relative solution viscosity of 1.298.

Example 2

A polycarbonate with 30 mole % of DOD and 70 mole % of bisphenol A was prepared by the interfacial process. The granules had a relative solution viscosity of 1.341.

Example 3

A polycarbonate with 30 mole % of DOD and 70 mole % of bisphenol A was prepared by the melt transesterification process. The product had a relative solution viscosity of 1.28.

Comparison Example 1

A polycarbonate with 35 mole % of DOD and 65 mole % of bisphenol A was prepared by the melt transesterification process. The product had a relative solution viscosity of 1.295.

Comparison Example 2

A polycarbonate with 25 mole % of DOD and 75 mole % of bisphenol A was prepared by the melt transesterification process. The product had a relative solution viscosity of 1.295.

Comparison Example 3

A polycarbonate with 20 mole % of DOD and 80 mole % of bisphenol A was prepared by the melt transesterification process. The product had a relative solution viscosity of 1.295.

Tables 1–2 show a comparison with commercial Makrolon.

TABLE 1

| Comparison of solution viscosities | |
|---|---|
| Polycarbonate | Relative solution viscosity |
| Makrolon 2808/58 | 1.293 |
| Makrolon 3108 | 1.318 |
| Example 1 | 1.298 |
| Example 2 | 1.341 |
| Example 3 | 1.277 |
| Comparison example 1 | 1.295 |
| Comparison example 2 | 1.298 |
| Comparison example 3 | 1.286 |

TABLE 2

Comparison of notched impact resistance and softening point

| | Notched impact test to ISO 180/4A | | | |
|---|---|---|---|---|
| Polycarbonate | 23° C. [kJ/m²] | −40° C. [kJ/m²] | −50° C. [kJ/m²] | −60° C. [kJ/m²] |
| Makrolon 2808/58 | 90z | 8s | 9s | 7s |
| Makrolon 3108 | 95z | 11s | 8s | 8s |
| Example 1 | 82z | 56z | 58z | 60z |
| Example 2 | 67z | 67z | 65z | 66z |
| Example 3 | 54z | 60z | 38z | 42z |
| Comparison ex. 1 | Not determined | 35z | 26s | 20s |
| Comparison ex. 2 | Not determined | 19s | Not determined | 13s |
| Comparison ex. 3 | Not determined | 14s | Not determined | 11s | s = brittle fracture
z = ductile fracture

Table 2 shows the superior low temperature strength of the copolycarbonates according to the invention of Examples 1–3 at −60° C.

TABLE 3

| Comparison of the notched impact strengths according to ISO 180/4A in [kJ/m²] | | |
|---|---|---|
| Conditions of storage with tempering | Example 1 | Makrolon 2808 |
| 46 h at 135° C. | 52z | 8s |
| 7 d at 135° C. | 54z | |
| 20 d at 135° C. | 52z | |
| 2 h at 150° C. | 53z | |
| 24 h at 150° C. | 53z | | s = brittle fracture
z = ductile fracture

As shown in table 3 the copolycarbonate according to the invention has a markedly unchanged property profile even after ageing. After a storage period of only 46 hours at 135° C. the polycarbonate of pure bisphenol A displays brittle fracture properties whereas the ductile properties of the copolycarbonate can still be observed even after 7 days. In addition, even when stored at 150° C. followed by an examination of notched impact strength the copolymer displays high level ductile fracture properties.

What is claimed is:
1. A process of using a thermoplastic molding composition that contains a copolycarbonate comprising 34 to 26 mole % of residues of compounds corresponding to formula (I),

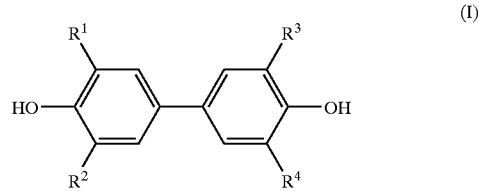

wherein
$R^1$ to $R^4$ independently of one another, represent H, $C_1$–$C_4$-alkyl, phenyl, substituted phenyl or halogen, and 56 to 74 mole % of residues of compounds corresponding to formula (II)

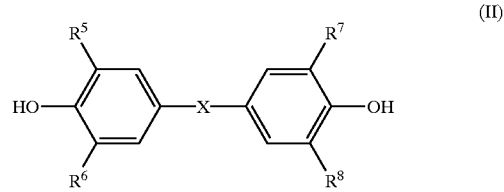

wherein
$R^5$ to $R^8$ independently of one another, are H, $CH_3$, Cl or Br, and
X is $C_1$–$C_5$-alkylene, $C_2$–$C_5$-alkylidene, $C_5$–$C_6$-cycloalkylene, $C_5$–$C_{10}$-cycloalkylidene, as monomers,
wherein the total of said mole % of residues of monomers corresponding to formula (I) and formula (II) is equal to 100 mole % the process comprising molding an article and subjecting the article to temperature lower than 0° C..

2. The process of claim 1 wherein the article is a film.

3. The process of claim 1 wherein the copolycarbonate comprise 30 mole % of residues of compounds corresponding to formula (I).

4. The process of claim 1 wherein the compound of formula (I) is 4,4'-dihydroxydiphenyl.

5. The process of claim 1 wherein said copolycarbonates comprise 30 mole % of residues of 4,4'-dihydroxydiphenyl.

* * * * *